Figure 1:
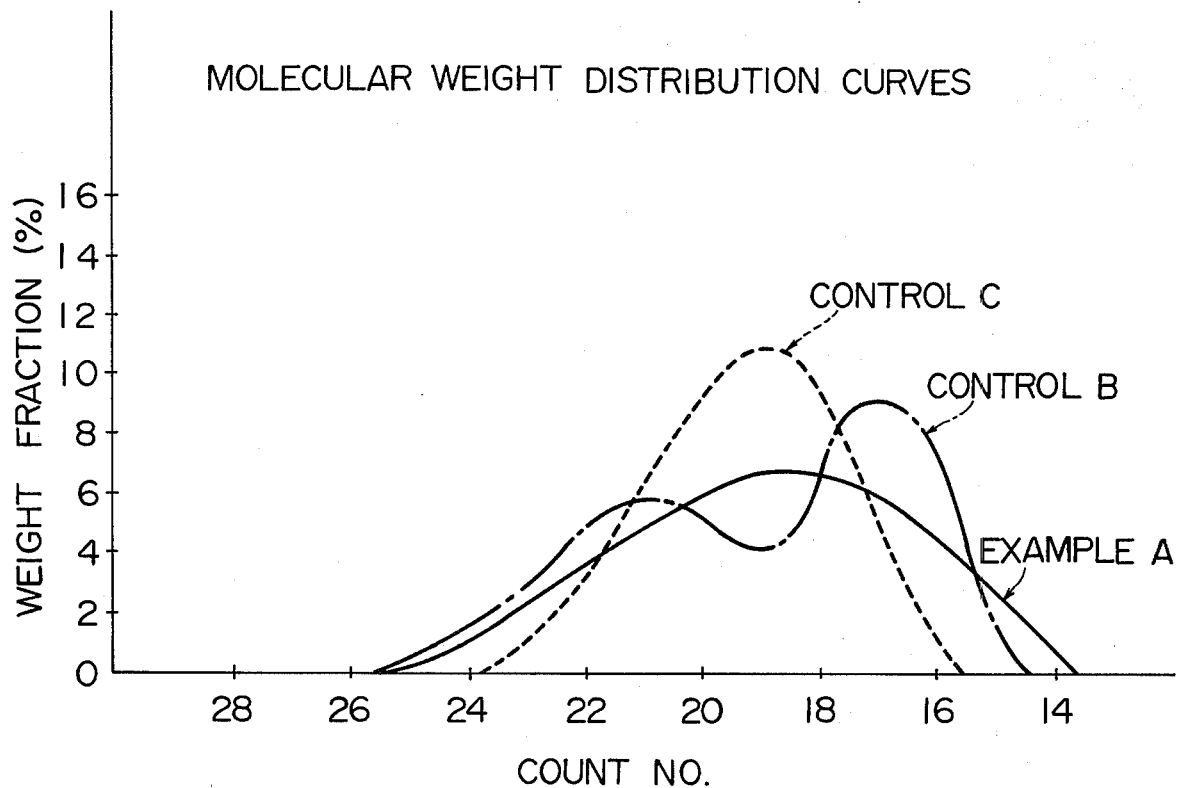

United States Patent [19]
Sakamoto et al.

[11] 3,980,625
[45] Sept. 14, 1976

[54] METHOD FOR PRODUCING NOVEL RUBBERY POLYMERS FROM DIENE MONOMERS

[75] Inventors: Kuniaki Sakamoto; Toshio Ibaragi, both of Kawasakishi; Osamu Suzuki, Tokyo, all of Japan

[73] Assignee: Asahi Kasei Kogyo Kabushiki Kaisha, Osaka, Japan

[22] Filed: Jan. 15, 1974

[21] Appl. No.: 433,605

Related U.S. Application Data

[63] Continuation-in-part of Ser. No. 145,812, May 21, 1971, abandoned.

[30] Foreign Application Priority Data

May 25, 1970 Japan............................. 45-43981

[52] U.S. Cl.............................. 526/67; 260/880 B; 260/887; 526/70; 526/173; 526/340
[51] Int. Cl.²........................ C08D 1/20; C08D 3/08
[58] Field of Search .......... 260/83.7, 94.2 M, 880 B

[56] References Cited
UNITED STATES PATENTS

| | | | |
|---|---|---|---|
| 3,278,644 | 10/1966 | Zelinski | 260/894 |
| 3,284,430 | 11/1966 | Forman | 260/94.2 |
| 3,361,730 | 1/1968 | Naylor | 260/94.3 |
| 3,363,659 | 1/1968 | Keckler | 152/330 |
| 3,438,952 | 4/1969 | Christensen | 260/83.7 |
| 3,510,467 | 5/1970 | Azoulay | 260/94.4 |
| 3,736,312 | 5/1973 | Halasa | 260/94.2 |

*Primary Examiner*—Christopher A. Henderson, Jr.
*Attorney, Agent, or Firm*—Burgess, Dinklage & Sprung

[57] ABSTRACT

Novel rubbery polymer having a uniform and broad molecular weight distribution, a ratio of weight average molecular weight to number average molecular weight of 3 or more, a content of monovinyl aromatic compound of 0 to 30% by weight, a bonding manner of conjugated diolefin of 60% or more of 1,4-linkage and improved processability and physical properties can be obtained by circulating living polymer in the polymerization or copolymerization of conjugated diolefins or copolymerization of conjugated diolefin and monovinyl aromatic hydrocarbon carried out with a lithium-based catalyst.

5 Claims, 2 Drawing Figures

MOLECULAR WEIGHT DISTRIBUTION CURVES

METHOD FOR PRODUCING NOVEL RUBBERY POLYMERS FROM DIENE MONOMERS

This application is a continuation-in-part of application Ser. No. 145,812, filed May 21, 1971 now abandoned.

DESCRIPTION OF THE INVENTION

This invention relates to a method for producing rubbery polymer having superior practical physical properties and processability.

It has been heretofore known that the polybutadiene and butadiene-styrene copolymer rubbers obtained by solution polymerization using a lithium-based catalyst have superior physical properties useful in practice, such as excellent resilience and abrasion resistance, as compared with those obtained by emulsion polymerization, and their molecular weight distributions are relatively narrow, for example, the ratio of weight average molecular weight ($\overline{M}w$) to number average molecular weight ($\overline{M}n$), Q, is lower than 2.

However, polybutadiene rubber and butadiene-styrene rubbery copolymers obtained in a solution polymerization by using a lithium-based catalyst are inferior in storage and processability in spite of their superior practical physical properties. For example, a solution-polymerized polybutadiene has a large "cold flow" property and inconvenience in handling. These are fatal for a practical commercial product. Further, a solution-polymerized butadiene-styrene copolymer is exceedingly inferior in blending fillers such as carbon black in a Banbury mixer, clinging to open rolls, and permitting only low extrusion speeds from an extruder. For this reason it is not produced commercially notwithstanding its superior practical properties.

Recently, a "polymodal" cis-polybutadiene which has two or more peaks in the molecular weight distribution, as taught in the Japanese Pat. No. 22/1966, has been developed with regard to cis-polybutadiene in order to control cold flow.

It is possible to reduce the cold flow during the time of storage but inferiority in processability still remains. Namely, because of its extremely high molecular weight polymer component, its mixing property in mixing fillers such as carbon black in a Banbury mixer is inferior, and because of the high Mooney viscosity of compounded products, it is also inferior in milling.

Thus since there is no rubber having both superior physical properties and processability, a compromise has been reached between poor processability and physical properties by mixing emulsion-polymerized butadiene-styrene rubbery copolymers and polybutadiene; or a mixture of emulsion-polymerized butadiene-styrene rubbery copolymers and solution-polymerized butadiene-styrene rubbery copolymers; or a mixture of emulsion-polymerized and solution-polymerized polybutadiene rubbers.

We have made comprehensive studies for finding a raw material rubber showing less cold flow, good processability and desirable physical properties and found that the polybutadiene and butadiene-styrene-rubbery copolymers having a monomodal and broad molecular weight distribution i.e. whose $\overline{M}w/\overline{M}n$ values are 3 or more (usually less than about 10), which are produced by solution polymerization using a lithium-based catalyst, serve the purpose. However, even if their $\overline{M}w/\overline{M}n$ is 3 or more, those which show so called polymodal distribution as seen in Japanese Pat. No. 22/1966, are inferior in processability and must be differentiated from those which are obtained according to the present invention and also have $\overline{M}w/\overline{M}n$ of 3 or more. Whereas the polybutadiene and butadiene-styrene rubbery copolymers solution-polymerized by the use of lithium-based catalyst, has, as above-mentioned, generally a $\overline{M}w/\overline{M}n$ of less than 2, in order to obtain polymers having a monomodal and broad molecular weight distribution and a $\overline{M}w/\overline{M}n$ or 3 or more, it would be sufficient if a number of samples having different average molecular weights are mixed, but this requires many polymerization vessels in actual practice and is considered to be almost impossible considering the size and function of mixing vessels, etc.

Accordingly, it is an object of the present invention to provide a solution-polymerized rubber having a uniform and borad molecular weight distribution and a $\overline{M}w/\overline{M}n$ of 3 or more by way of a lithium-based catalyst.

We have discovered that the above-mentioned object can be attained by the method of the present invention in which active polymers, i.e. living polymers, are withdrawn from a polymerization zone and partly recirculated to said polymerization zone together with fresh catalyst, monomer and solvent.

Thus according to the method of the present invention, random rubbery copolymers having a monomodal and broad molecular weight distribution, a ratio of weight average molecular weight to number average molecular weight of 3 or more, preferably at least about 4, a content of monovinyl aromatic compound of 0 to 30% by weight and a 1,4-linkage content of 60% or more can be produced by recirculating living polymers in the polymerization or copolymerization carried out by using a lithium-based catalyst, from one or more kinds of conjugated diolefins or a mixture of these and a monovinyl aromatic hydrocarbon. The term "monomodal" herein referred to, means that a molecular weight distribution curve thereof consists basically of one peak which is differentiated from so-called polymodal distribution.

Thus the method of the present invention for producing rubbers having a monomodal and broad molecular weight distribution and a $\overline{M}w/\overline{M}n$ of 3 or more relies as above-mentioned on the recirculation of a part of living polymer together with fresh monomer, solvent and catalyst, and the proportion of living polymer to be recirculated relative to all the living polymer leaving the polymerization vessel is about 20% by weight to 80% by weight, preferably about 40 to 60% by weight. When the proportion is less than 20% by weight, the effectiveness of recirculation is small, it is difficult to make Q 3 or more and the processability and physical properties are not especially improved compared with conventional solution-polymerized rubbers. Further when the recirculation ratio is greater than 80%, the retention time of the polymers leaving a polymerization vessel without being circulated becomes shorter, and unreacted monomer remains. This is not desirable in production.

Figure 2:
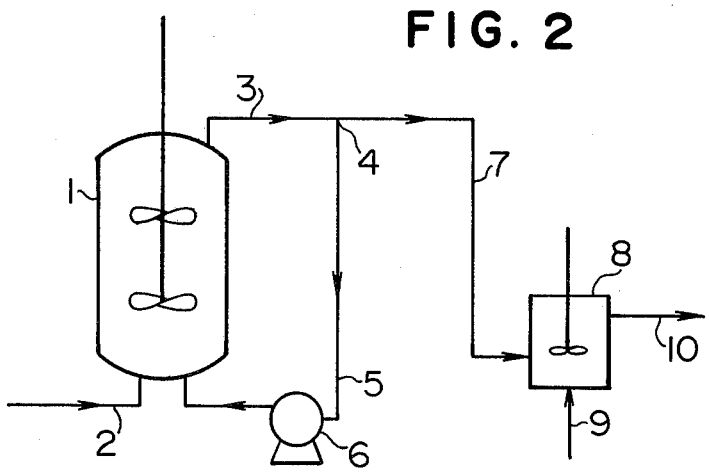

The above-mentioned continuous polymer-recirculating process is illustrated in FIG. 2 so that the process may be more fully understood.

In FIG. 2, fresh monomer, solvent and catalyst are introduced into polymerization reactor 1 through pipe 2, and living polymer solution containing substantially no unreacted monomer is taken out through pipe 3. A part of this solution is recirculated into reactor 1 through division point 4 and recirculating line 5 containing polymer pump 6. The other part of the solution is fed into mixer 8 through pipe 7, and deactivating agent (and/or process oil) are added therein through pipe 9. The resulting deactivated solution is taken out through pipe 10 and sent to dryer 10.

When a conjugated diolefin polymer is to be produced with a lithium-based catalyst, there will be no problem but when a conjugated diolefin and a monovinyl aromatic hydrocarbon are to be copolymerized, for example, 1,3-butadiene and styrene are to be copolymerized in a hydrocarbon solvent, a minor portion of styrene is combined at random in a rubbery copolymer, because the polymerization rate of styrene is lower than that of 1,3-butadiene. Accordingly, it is necessary to carry out polymerization in a type of polymerization reactor in which a complete mixing can be effected.

Further in the method for producing butadiene-styrene random rubbery copolymers by using a lithium-based catalyst, it is possible, as seen in the official gazette of Japanese Pat. No. 15386/1961 to obtain a random rubbery copolymer of butadiene and styrene by adding together with a lithium-based catalyst an additive having a polar radical e.g. ethers such as diethyl ether, tetrahydrofuran, 1,3-dioxane, polyethylene oxide or polypropylene oxide, or tertiary amines such as trimethylamine. In such a case, it is necessary to add a polar-group-containing additive to make the 1,4-linkage content more than 60%, i.e. 1,2-linkage content less than 40%, because such an additive as those above-mentioned increases the amount of 1,2-linkage of butadiene.

One of the monomers used in the method of the present invention is a conjugated diolefin. Suitable examples of these include 1,3-butadiene, 2-methyl-1,3-butadiene, 1,3-pentadiene, etc.

Another monomer used in the method of the present invention is a monovinyl aromatic hydrocarbon. As suitable examples, styrene, α-methylstyrene, divinylstyrene, 3-vinyltoluene, 1-vinylnaphthalene are illustrated.

One or more kinds of these monomers can be used in the method of the present invention but it is preferable that a monovinyl aromatic hydrocarbon is present in an amount of 30% by weight or less in the resultant copolymer. When it is present in an amount of more than 30% by weight, the resultant copolymers become hard and are not suitable for being used as a cured product on account of insufficient resilience and heat build-up.

Hydrocarbon solvents used in the production of butadiene polymer and butadiene-styrene copolymer in the practice of the present invention, are those selected from the group consisting of aromatic hydrocarbons, paraffins and cycloparaffins. Illustrative suitable hydrocarbons include normal-pentane, normal-hexane, iso-octane, cyclopentane, cyclohexane, methylcyclopentane, benzene, toluene, xylene, ethylbenzene, naphthalene, etc.

Lithium-based catalysts include metallic lithium, methyl lithium, ethyl lithium, butyl lithium, amyl lithium, hexyl lithium, 2-ethylhexyl lithium, phenyl lithium, various kinds of tolyl lithium, xylyl lithium, alpha-naphthyl lithium, methylene dilithium, tetramethylene dilithium, 1,4-dilithium benzene, 1,5-dilithium naphthalene, etc.

The polymerization of butadiene or the copolymerization of butadiene and styrene can be carried out at a temperature ranging from about 20°C – 150°C but it is preferable to carry it out usually at a temperature from about 80°C – 130°C. It is usually preferable to carry out polymerization under a pressure sufficient to keep the monomer(s) and the solvent substantially in liquid state.

The above-mentioned production method gives rubbery polymers having a molecular weight distribution much broader than those of the polymers obtained by conventional known methods.

It is preferable that the polybutadiene and butadiene-styrene rubbery copolymers which are produced according to the method of the present invention and used in tire treads have Mooney viscosities in the range of about 30 to 150, preferably about 50 to 125. A Mooney viscosity of less than 30 is not desirable from the standpoint of the physical properties of the products. On the other hand, a Mooney viscosity greater than 150 is not desirable in practice from the standpoint of processing, particularly extrusion processability and dispersibility of carbon black, etc.

As for the linkage of butadiene in polybutadiene and butadiene-styrene rubbery copolymers, it is preferable that the content of 1,4-linkage is 60% or more. A content of 1,4-linkage less than 60% is not desirable from the standpoint of the physical properties of tire treads, particularly producing low abrasion resistance and high heat build-up in running of the tire.

The polybutadiene and butadiene-styrene rubbery copolymers produced according to the method of the present invention are used practically by mixing solely or in combination with natural rubber or/and other synthetic rubbers, with various kinds of compounding agents, followed by processing to produce products.

In general, it is preferable that the polybutadiene and the butadiene-styrene rubbery copolymers produced according to the method of the present invention be used alone as a raw material rubber for tire treads, etc. However, they may be used as a mixture with natural rubber or/and other synthetic rubbers according to the type and use of the tire. Further these natural or/and synthetic rubbers are used alone or in a mixture, but in order to make them exhibit the characteristic properties of polybutadiene and butadiene-styrene rubbery copolymers fully, the content of the rubbery polymer of the present invention is preferably more than 30% by weight of the raw material rubber used in the composition for tire tread, etc.

Process oils and carbon black additions are particularly important for superior physical properties when using the polybutadiene and the butadiene-styrene rubbery copolymers alone or in combination with natural rubber or/and other synthetic rubbers to produce compositions for tire treads.

The process oils used for the tire tread compositions which use the raw material rubber of the present invention, are naphthenic or aromatic oils having viscosity gravity constant (abbreviated hereinafter as VGC) of more than about 0.850 but aromatic process oils having a VGC of more than about 0.900 are particularly preferable.

The amount of process oil to be added in the method of the present invention, is in the range of about 25 – 75 parts by weight per 100 parts of raw material rubber. When the amount of process oil to be added is less than 25 parts by weight, the dispersion of filler and vulcanization accelerator does not go smoothly. In contrast with this, if the amount is more than 75 parts by weight, the physical properties of cured rubber are inferior.

Process oils can be mixed mechanically or they can be mixed in advance in the state of solution and used as an oil-extended rubber.

This type of carbon black used as a rubber compounding agent and the amount thereof to be compounded have a large influence upon the physical properties of a tire.

The amount of carbon black to be compounded in the production of the composition using the raw material rubber of the present invention should be varied depending upon the amount of process oil to be added at the same time. It is in the range of 40 – 100 parts by weight per 100 parts by weight of raw material rubber. When it is less than 40 parts by weight, the resultant tire tread suffers in physical properties, particularly abrasion resistance, etc. On the other hand, when it is more than 100 parts by weight, the dynamic properties and abrasion resistance of resultant products are undesirable.

As for kinds of carbon black, there is no difference from the ones used with usual natural rubber and emulsion-polymerized butadiene-styrene rubbery copolymers, and HAF grade or ISAF grade carbon black, etc. are used. It is preferable to select the kind of carbon black and to use an appropriate amount thereof depending upon the condition of rubber composition to be used. Further, carbon black can be mixed mechanically or in the form of a master batch.

Besides the above-mentioned process oil and carbon black, zinc oxide, stearic acid, antioxidants, inhibitors for degradation by ozone, vulcanization accelerators, curing agents, wax, etc., can also be added.

Thus the rubber composition comprising polybutadiene and/or butadiene-styrene random rubbery copolymers having a styrene content of 0 – 30% by weight, a content of 1,4-linkage of butadiene, of 60% or more, a Mooney viscosity of 30 to 150, monomodal and broad molecular weight distribution and a Q value of 3 or more, which was polymerized with a lithium-based catalyst, shows well-balanced and superior physical properties and processability compared with any conventional rubber compositions.

In practicing the invention the process is run continuously, fresh material and recirculated solution being introduced wholly continuously. Desirably the monomer content of the withdrawn living polymer is less than about 1%. At the mixer 8 (FIG. 2) the catalyst should be deactivated as by adding an anti-oxidant which reacts therewith, or by adding water, methanol ethanol, isopropanol or the like.

The present invention is further illustrated by the following non-limitative examples.

EXAMPLE 1

Into a 50 *l*-capacity polymerization reactor provided with a jacket, butadiene and hexane were continuously fed at a rate of 67 g/min and at a rate of 268 g/min, respectively, by means of a metering pump, and at the same time, 0.047 g per 100 g of the monomer, of butyl lithium was also continuously fed therein by means of a metering pump, while maintaining the temperature of the polymerization reactor at 110°C. At the same time, polymer solution was continuously discharged from the polymerization reactor and 50% was quantitatively recirculated into the polymerization reactor. After a steady state was attained, 0.5 g of 2,4-di-tertiary-butyl-p-cresol per 100 g of the polymer was mixed to kill the catalyst at the mixer. At the same time 50 g of an aromatic process oil per 100 g of the polymer was continuously fed. Then hexane was removed by usual method and there was obtained an oil-extended polymer having a monomodal and broad molecular weight distribution (Example A).

For comparison, two so-called "Bimodal" samples having different molecular weights, that is, a sample having a Mooney viscosity of 20 and a sample having an intrinsic viscosity [$\eta$] of 8.1, were mixed in a ratio of 1:1. A stabilizer and a process oil, each in the same amount as in the sample of Example A, were then added thereto to prepare an oil-extended polymer (Control B).

Main properties of the two kinds of the solution-polymerized polybutadienes thus obtained, and a commercially available oil-extended polybutadiene (Control C) obtained by the polymerization by means of a lithium-based catalyst, are shown in Table 1, and their molecular weight distribution curves (by G.P.C.) are shown in the accompanying drawing.

As is apparent from Table 1, the sample of Example A shows a very small cold flow as compared with Control C which is a customary solution-polymerized oil-extended polybutadiene.

Table 1

|  | Example A | Control B | Control C |
|---|---|---|---|
| Mooney viscosity before oil extension ($ML_{1+4}$ 100°C) | 91 | 90 | 91.5 |
| Butadiene-bonding[1] |  |  |  |
| Cis-1,4 | 40.5 | 41.5 | 41 |
| Trans-1,4 | 46.5 | 46.0 | 46.5 |
| 1,2-linkage | 13.0 | 12.5 | 12.5 |
| Mooney viscosity after oil extension ($ML_{1+4}$ 100°C) | 38 | 39 | 37 |
| Q($M_w/M_n$)[2] | 4.9 | 5.1 | 1.9 |
| Cold flow[3] g/30 min. | 0.48 | 0.55 | 0.90 |

[1] Calculated by Morero's method by means of infrared spectrophotometer.
[2] Determined by means of G.P.C. apparatus made by Waters company.
[3] Shown by the number of grams extruded at 75°C, under a load of 10 kg, in 30 minutes by means of a Melt Indexer, according to ASTM D-1238-57T as a method for measuring cold flow.

Next, each of these three kinds of polybutadienes was blended in a blending ratio as shown in Table 2, by means of B type Banbury mixer. The blending operation was carried out in a manner as shown in Table 3.

Table 2

|  | part by weight |
|---|---|
| Oil-extended polybutadiene | 150 |
| HAF grade carbon black | 85 |
| Stearic acid | 2 |
| Zinc oxide | 5 |
| Antioxidant D[1] | 1.0 |
| Vulcanization accelerator CZ[2] | 0.9 |
| Sulfur | 1.6 |

[1] phenyl-$\beta$-naphthylamine
[2] N-cyclohexylbenzothiazylsulfenamide

Table 3

| Primary blending step (blending temperature: 120°C) : | |
|---|---|
| 0 min | Polymer was fed. |
| 0.5 min | Zinc oxide, stearic acid and stabilizer D were fed. |
| 1.0 min | Half the amount of carbon black was fed. |
| 3.0 min | Half the amount of carbon black was fed. |

Table 3-continued

| Primary blending step (blending temperature: 120°C): | |
|---|---|
| 6.0 min | Taken out. |
| Secondary blending step (blending temperature: 90°C): | |
| 0 min | Primary blend was fed. |
| 0.5 min | Accelerator CZ and sulfur were fed. |
| 3.0 min | Taken out. |

Further, in order to observe the blending property of the three kinds of rubber blends, the degree of dispersion of carbon black was measured and is shown in Table 4.

Table 4

| | Degree of dispersion[1] of carbon black |
|---|---|
| Example A | 94 |
| Control B | 78 |
| Control C | 80 |

[1]Blend sample is cured at a low temperature with sulfur chloride, and then sliced into a 2 micron section. Dispersion states are examined by means of an optical microscope of 100 times magnification.

In order to show them by numerical value, an eye-piece lens having graduations of 100 × 100 square sections is mounted and a combination of the eye-piece and other lens system of the microscope is arranged to make one section correspond to 13 × 13 microns.

The part within the visual field of the surface of each sample which comes into the 100 × 100 square sections of grating is taken up and the ratio of the sections in which more than half of the section is covered by an aggregate of carbon black is calculated. Thus the quality of dispersion of carbon black is indicated by the results of this calculation.

As is apparent from Table 4, the degree of dispersion of carbon black in the rubber composition having a monomodal and wide molecular weight distribution, produced according to the method of the present invention, is far superior to those of customary solution-polymerized oil-extended polybutadienes, and the so-called Bimodal oil-extended polybutadiene is superior in cold flow, but is similar or slightly inferior in miscibility to customary oil-extended polybutadienes. From such a fact, there can be observed an improvement in Banbury miscibility of the composition comprising the raw material rubber produced according to the method of the present invention, which brings about advantages such as reduction in time at the filler-blending step in tire production.

Next, the properties of the three kinds of blends and their extrusion processability using a die extruder, were evaluated. The results are shown in Table 5.

Table 5

| | Blend of Example A | Blend of Control B | Blend of Control C |
|---|---|---|---|
| Mooney viscosity of blend (ML$_{1+4}$ 100°C) | 90 | 110 | 93 |
| Green strength (kg/cm$^2$) | 4.5 | 4.3 | 8.6 |
| Extrusion Velocity (kg/hr) | 60 | 40 | 44 |
| Surface state of extruded product | 4 | 3 | 3 |
| State of edge | good | bad | bad |
| Extrusion conditions: | | | |
| Compounding temperature | 100°C | | |
| Revolutions of screw | 50 rpm | | |
| Temperature of screw | 23 – 24°C | | |

Table 5-continued

| | Blend of Example A | Blend of Control B | Blend of Control C |
|---|---|---|---|
| Temperature of die | 100°C | | |

As is apparent from Table 5, the composition A comprising the raw material rubber produced according to the method of the present invention, is superior in extrusion processability in respect of velocity, state of surface of extruded product, state of edge, etc., to customary oil-extended polybutadienes, and also to the Bimodal sample. Further, the Bimodal sample had a particularly high Mooney viscosity, and an undersirable result was obtained in milling, etc. Furthermore, the blend of Example A was improved in green strength as compared with Control C.

Next, the three kinds of blends were vulcanized in a press at 140°C for 30 minutes, and their physical properties were measured. The results are shown in Table 6.

Table 6

| | Vulcanized product of Example A | Vulcanized product of Control B | Vulcanized product of Control C |
|---|---|---|---|
| Hardness[1] | 65 | 65 | 66 |
| Tensile stress[1] at 300% elongation (kg/cm$^2$) | 105 | 105 | 103 |
| Tensile strength[1] (kg/cm$^2$) | 190 | 185 | 170 |
| Tensile[1] elongation (%) | 500 | 500 | 500 |
| Tear strength (kg/cm) | 38 | 38 | 36 |
| Resilience[2] | 56 | 55 | 50 |
| Slip[3] resistance on a wet road surface | 64 | 64 | 60 |
| Slip resistance[3] on an ice surface | 63 | 60 | 55 |

[1]Measured under the measurement conditions according to JIS K-6301 (JIS: Japanese Industrial Standards).
[2]Measured by means of Danlop's Trypsometer.
[3]Gravitational friction coefficients between a wet asphalt road surface or an ice road surface and a tire-tread rubber were measured by means of an instrument for measuring slip resistance, developed by British Road Institute.

As is apparent from Table 6, the vulcanized product of Example A comprising the raw material rubber produced according to the method of the present invention, is superior in physical properties, particularly required for tire-tread, i.e. in resilience, and slip resistances on a wet road surface and on an ice surface.

In comparisons of Tables 1, 4, 5 and 6, the polybutadiene having a monomodal and broad molecular weight distribution, produced according to the method of the present invention, has a remarkably improved cold flow, and when applied to a tire-tread composition, it was superior in dispersibility of carbon black and extrusion processability, and further showed superior results in physical properties such as resilience and slip resistance.

On the other hand, so-called Bimodal polybutadiene was improved in cold flow and physical properties as compared with customary solution-polymerized polybutadienes, but was still not improved in the point of processing operation of blend, and thus it could be evaluated as "similar or slightly inferior".

EXAMPLE 2

Solution-polymerized butadiene-styrene random copolymerized rubbers having different molecular weight distributions, were prepared in a similar manner as in Example 1, but by using a perfect blending type 50 l-capacity polymerization reactor provided with a jacket, by adding styrene to the monomer and by varying the recirculation ratio (Control D, Control E, Example F, Example I and Example J).

In addition, other solution-polymerized butadiene-styrene random copolymerized rubbers having different molecular weight distributions, were prepared by using the same apparatus and by adding tetrahydrofuran as a randomizing agent (Example G and Control H).

Into these seven kinds of copolymers were blended 0.5 g based on 100 g of copolymer, of 2,4-ditertiary-butyl-p-cresol, as a stabilizer, and 37.5 g based on 100 g of copolymer, of a process oil having a VGC of 0.951 and a specific gravity of 0.9988, as an aromatic type process oil.

The polymerization conditions and fundamental physical properties of the seven kinds of copolymers thus obtained are shown in Table 7.

B type Banbury blender and in a manner as shown in Table 9.

Table 8

|  | Part by weight |
|---|---|
| Oil-extended copolymerized rubber | 137.5 |
| Aromatic process oil[1] | 12.5 |
| HAF grade carbon black | 85 |
| Stearic acid | 2 |
| Zinc oxide | 5 |
| Antioxidant D[2] | 1.0 |
| Vulcanization accelerator CZ[2] | 0.9 |
| Sulfur | 1.6 |

[1]Process oil having a VGC of 0.951 and a specific density of 0.9988
[2]Same with those in Table 2.

Table 9

| Primary blending step (blending temperature 120°C) | |
|---|---|
| 0 min | Polymer was fed. |
| 0.5 min | Zinc oxide, stearic acid and antioxidant D were fed. |
| 1.0 min | Total amount of carbon black was fed. |
| 3.0 min | Process oil was fed. |
| 6.0 min | Taken out. |
| Secondary blending step is same as that in Table 3. | |

Table 7

|  | Control D | Control E | Example F | Example G | Control H | Example I | Example J |
|---|---|---|---|---|---|---|---|
| Polymerization conditions | | | | | | | |
| Polymerization temperature (°C) | 115 | 115 | 115 | 110 | 110 | 120 | 115 |
| Mean retention time (min) | 60 | 60 | 60 | 60 | 60 | 60 | 60 |
| Circulation ratio (%) | 0 | 10 | 50 | 50 | 0 | 40 | 60 |
| Monomer concentration (%) | 20 | 20 | 20 | 20 | 20 | 20 | 20 |
| Monomer ratio by weight (butadiene/styrene) | 75/25 | 75/25 | 75/25 | 75/25 | 75/25 | 75/25 | 75/25 |
| Butyl lithium (g) (total monomer, 100 parts by weight) | 0.05 | 0.05 | 0.05 | 0.05 | 0.05 | 0.05 | 0.05 |
| Tetrahydrofuran concentration (% by weight) | 0 | 0 | 0 | 0.5 | 0.5 | 0 | 0 |
| Fundamental physical properties | | | | | | | |
| Mooney viscosity (ML$_{1+4}$ 100°C) | 103 | 102 | 103 | 105 | 105 | 98 | 105 |
| Content of bonded styrene (%)[1] | 24.8 | 24.9 | 25.1 | 24.9 | 25.0 | 25.0 | 24.8 |
| Content of block styrene (%)[2] | 0.8 | 0.8 | 0.6 | 0 | 0.1 | 0.7 | 0.7 |
| Butadiene bonding[1] | | | | | | | |
| Cis-1,4-linkage (%) | 40.5 | 40.5 | 40.5 | 26 | 25 | 38.5 | 39.0 |
| Trans-1,4-linkage | 48.5 | 49.0 | 49.0 | 47 | 46 | 50.5 | 49.5 |
| 1,2-linkage | 11.0 | 10.5 | 11.0 | 27 | 29 | 11.5 | 11.5 |
| $\overline{M}w/\overline{M}n$[3] | 1.9 | 2.3 | 4.5 | 5.0 | 1.95 | 3.9 | 4.7 |
| Mooney viscosity after oil-extension (ML$_{1+4}$ 100°C) | 42 | 42 | 42.5 | 43 | 43 | 40 | 44 |

[1]The content of styrene and the butadiene bonding manner were calculated by Hampton's method by means of an infrared photospectrometer.
[2]Two parts by weight of copolymerized rubber were dissolved in 100 parts by weight of carbon tetrachloride. Five parts by weight of tertiary-butylhydroperoxide and further 0.01 part by weight of osmium tetraoxide were added thereto. The resultant mixture was decomposed by heating at 80°C for 15 minutes. To the solution thus obtained was added a large amount of methanol to give a precipitate which was a block styrene. This precipitate was filtered, dried in vacuum and weighed to calculate the amount of block styrene as % by weight based on butadiene-styrene copolymerized rubber.
[3]Obtained according to GPC method.

For an additional comparison of the five butadiene-styrene random copolymerized rubbers (sample D, E, F, G, H), a commercially available, emulsion-polymerized SBR (SBR-1712) was blended under the following blending formulation as shown in Table 8, by means of Six kinds of blends thus obtained were extruded by means of a Garvey Die extruder to observe their degree of dispersion of carbon black and their extrusion characteristics. The results are shown in Table 10.

Table 10

|  | Blend of Control D | Blend of Control E | Blend of Example F | Blend of Example G | Blend of Control H | Blend of Control SBR 1712 |
|---|---|---|---|---|---|---|
| Extrusion velocity (kg/hr) | 48 | 52 | 70 | 69 | 46 | 68 |
| Surface state | | | | | | |

Table 10-continued

|  | Blend of Control D | Blend of Control E | Blend of Example F | Blend of Example G | Blend of Control H | Blend of Control SBR 1712 |
| --- | --- | --- | --- | --- | --- | --- |
| of extruded product | 4 | 4 | 5 | 5 | 3 | 4 |
| State of edge | bad | bad | good | good | bad | good |
| Degree of dispersion of carbon black | 80 | 84 | 95 | 94 | 78 | 90 |

Extrusion conditions are similar to those in Table 5.

As is apparent from Table 10, the compositions comprising butadiene-styrene random copolymer having a monomodal and broad molecular weight distribution, produced according to the method of the present invention (F and G), are far superior in dispersibility of carbon black to customary solution-polymerized butadiene-styrene random copolymerized rubbers (D and H), and are superior to or equivalent to emulsion-polymerized butadiene-styrene copolymerized rubbers, and further are superior in extrusion velocity, surface state of extruded product, state of edge, etc. to customary solution-polymerized SBR or emulsion-polymerized SBR. The good Banbury miscibility and the excellent extrusion processability of the compositions comprising raw material rubbers prepared according to the method of the present invention, are useful, for example, in the reduction in time for producing tires.

Next, the six blends were vulcanized in a press at 140°C, for 30 minutes to observe their physical properties. The results are shown in Table 11.

Table 11

|  | Vulcanized product of Control D | Vulcanized product of Control E | Vulcanized product of Example F | Vulcanized product of Example G | Vulcanized product of Control H | Vulcanized product of Control SBR 1712 |
| --- | --- | --- | --- | --- | --- | --- |
| Hardness | 62 | 63 | 63 | 62 | 63 | 62 |
| Tensile stress at 300% elongation (kg/cm$^2$) | 97 | 100 | 105 | 103 | 100 | 121 |
| Tensile strength (kg/cm$^2$) | 183 | 187 | 195 | 190 | 185 | 200 |
| Elongation (%) | 500 | 480 | 500 | 500 | 500 | 480 |
| Tear strength (kg/cm) | 36 | 38 | 43 | 41 | 38 | 35 |
| Resilience (20°C) | 45 | 46 | 47 | 42 | 37 | 34 |
| Slip resistance on a wet road surface | 90 | 93 | 102 | 103 | 93 | 100 |

Measurement conditions are same as those in Table 6.

As shown in Table 11, the vulcanized products of the compositions comprising raw material rubbers prepared according to the method of the present invention, make superior tire-treads, particularly with respect to resilience and slip resistance on a wet road surface.

As is apparent from the above (Tables 10 and 11), the compositions comprising butadiene-styrene random copolymerized rubber having a monomodal and broad molecular weight distribution, produced according to the method of the present invention, are extremely well balanced products which are satisfactory in all respects of dispersibility of blending agents, extrusion processability, physical properties, etc.

EXAMPLE 3

The five butadiene-styrene copolymerized rubbers (D) – (H) obtained in Example 2 and the emulsion-polymerized SBR-1712 for comparison, were blended by means of a No. 11 Banbury blender and under the blending formulation as shown in Table 12, and further extruded by means of a factory scale extruder into a tire-tread form. The extrudate was adhered to a raw tire containing a carcass (tire size: 6.40 – 14) of an emulsion-polymerized butadiene-styrene copolymerized rubber blend and a nylon tire cord, and the adhered product was vulcanized at a standard vulcanization temperature to give tires.

Six of the tires thus obtained were each attached to an actual car to observe the temperature of heat build-up inside the tire during the driving, abrasion resistance, driving stability, etc. The results are shown in Table 13.

Table 12

|  | Part by weight |
| --- | --- |
| Butadiene-styrene copolymerized rubber | 137.5 |
| Aromatic process oil[1] | 12.5 |
| ISAF grade carbon black | 85 |
| Stearic acid | 2 |
| Zinc oxide | 3 |
| Vulcanization[2] accelerator NS | 1.6 |
| Sulfur | 1.4 |
| Antioxidant AW[3] | 1 |
| Antioxidant B[4] | 1 |
| Paraffin wax | 2 |

[1] Process oil having a VGC of 0.951 and a specific gravity of 0.9988.
[2] n-oxydiethylene-2-benzothiazylsulfenamide
[3] 6-ethoxy-2,2,4-trimethyl-1,2-dihydroquinoline
[4] A high temperature reaction product of diphenyl amine and acetone.

Table 13

|  | Blend of Control D | Blend of Control E | Blend of Example F | Blend of Example G | Blend of Control H | Blend of Control SBR 1712 |
|---|---|---|---|---|---|---|
| Processability | bad | bad | good | good | bad | good |
| Temperature inside[1] the tire | 62 | 61 | 60 | 63 | 71 | 80 |
| Abrasion index of[2] tire | 125 | 124 | 124 | 118 | 115 | 100 |
| Slip resistance on a wet road surface Driving property[3] on a road | 85 | 87 | 105 | 105 | 90 | 100 |
| Braking property[4] | 80 | 85 | 103 | 105 | 90 | 100 |
| Traction[5] | 90 | 90 | 100 | 105 | 90 | 100 |

[1] Difference between the temperature inside the tire tube observed by means of thermocouple and the environmental temperature at the time of 100 kg/hr driving.

[2] The abrasion resistance of SBR-1712 blend is taken as 100.

[3] Driving property-measure the velocity when a car fitted with test tires is run on the circumference of a circle having a radius of 5 m, the tires are gradually accelerated and slip occurs. The driving property of the tire of SBR-1712 blend is set at 100.

[4] Braking property-measure the distance of run of a tire suddenly braked at a speed of 20 km/hr to complete stop. The braking property of Control SBR-1712 blend is set at 100.

[5] Traction power in case where a tire is revolved at 800 rpm. The traction power of the tire of Control SBR-1712 blend is set at 100.

As shown in Table 13, the compositions comprising raw material rubber prepared according to the method of the present invention (F and G), are very good in workability, whereas solution-polymerized SBRs having a narrow molecular weight distribution are inferior in processability. Further, the compositions prepared according to the method of the present invention are extremely good in processability, practical properties for tire-tread, abrasion resistance and driving stability. Heretofore well known solution-polymerized SBRs are good in abrasion resistance, but inferior in driving stability. Further, solution polymerized SBRs having a narrow molecular weight distribution are inferior in processability. Emulsion-polymerized SBRs are inferior in abrasion resistance.

The compositions comprising raw material rubbers prepared according to the method of the present invention, are far superior in processability and practical properties, and show balanced properties.

What is claimed is:

1. In the production of a polymer wherein a conjugated diolefin monomer is polymerized with up to about 30% by weight of a monovinyl aromatic hydrocarbon monomer by supplying monomer to a polymerized together with a solvent to a polymerizer together with a catalyst selected from the group consisting of lithium, methyl lithium, ethyl lithium, butyl lithium, amyl lithium, hexyl lithium, 2-ethylhexyl lithium, phenyl lithium, tolyl lithium, xylyl lithium, naphthyl lithium, methylene dilithium, tetramethylene dilithium, dilithium benzene and dilithium naphthalene, at a temperature of about 20° to 150°C and a pressure sufficient to keep the solvent in liquid state, withdrawing from said polymerizer a solution of living polymer substantially free of monomer, recirculating to said polymerizer some of the withdrawn polymer-containing solution, and subsequently removing the solvent from the withdrawn polymer-containing solution, the improvement which comprises supplying said monomer continuously, withdrawing said polymer-containing solution continuously, continuously recirculating said withdrawn solution to the extent of about 20 to 80%, and discontinuing polymerization of the balance of the withdrawn solution, whereby the final polymer has a broad monomodal molecular weight distribution, a ratio of weight average molecular weight to number average molecular weight of 3 to 10, a Mooney viscosity of about 30 to 150 and a 1,4-linkage conjugated diolefin unit content of at least about 60%.

2. The process of claim 1 wherein said conjugated diolefin is 1,3-butadiene, isoprene or 1,3-pentadiene.

3. The process of claim 1 wherein said monovinyl aromatic hydrocarbon is styrene, alpha-methylstyrene or vinyltoluene.

4. The process of claim 1 wherein the withdrawn solution is recirculated to the extent of about 40 to 60%.

5. The process of claim 4 wherein said conjugated diolefin is 1,3-butadiene, isoprene or 1,3-pentadiene, and said monovinyl aromatic hydrocarbon is styrene, alpha-methylstyrene or vinyltoluene.

* * * * *